UNITED STATES PATENT OFFICE.

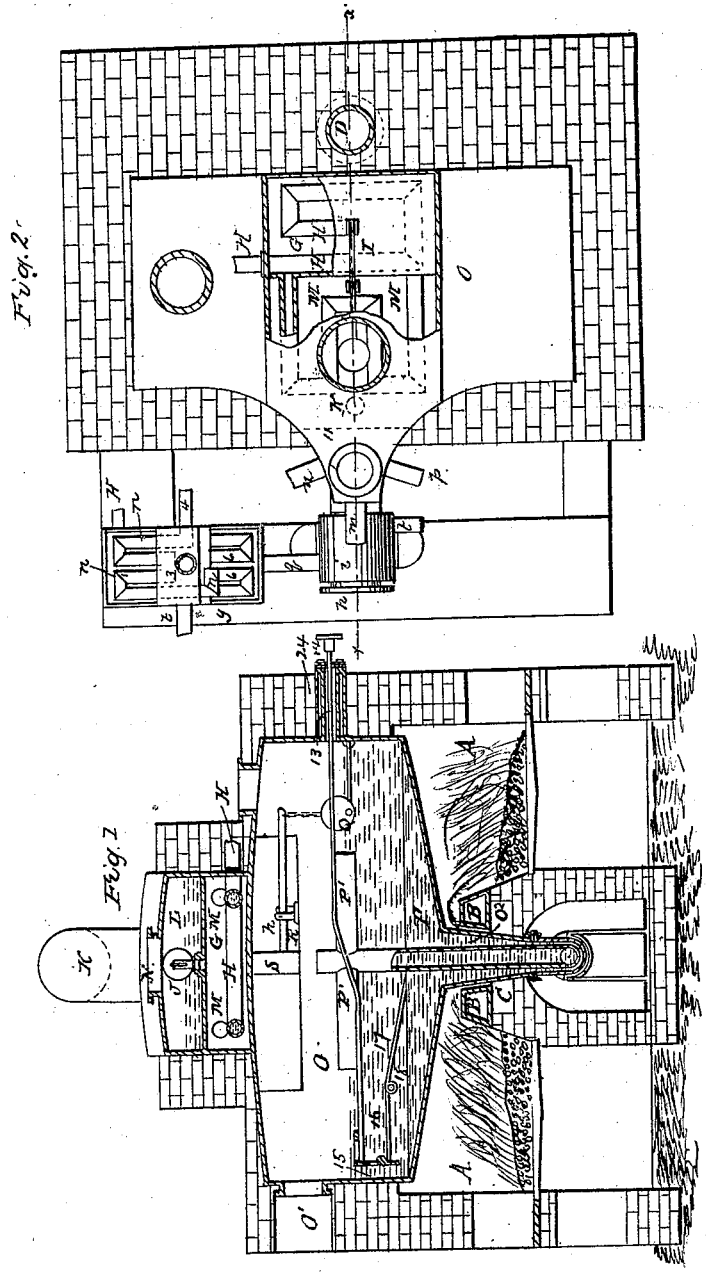

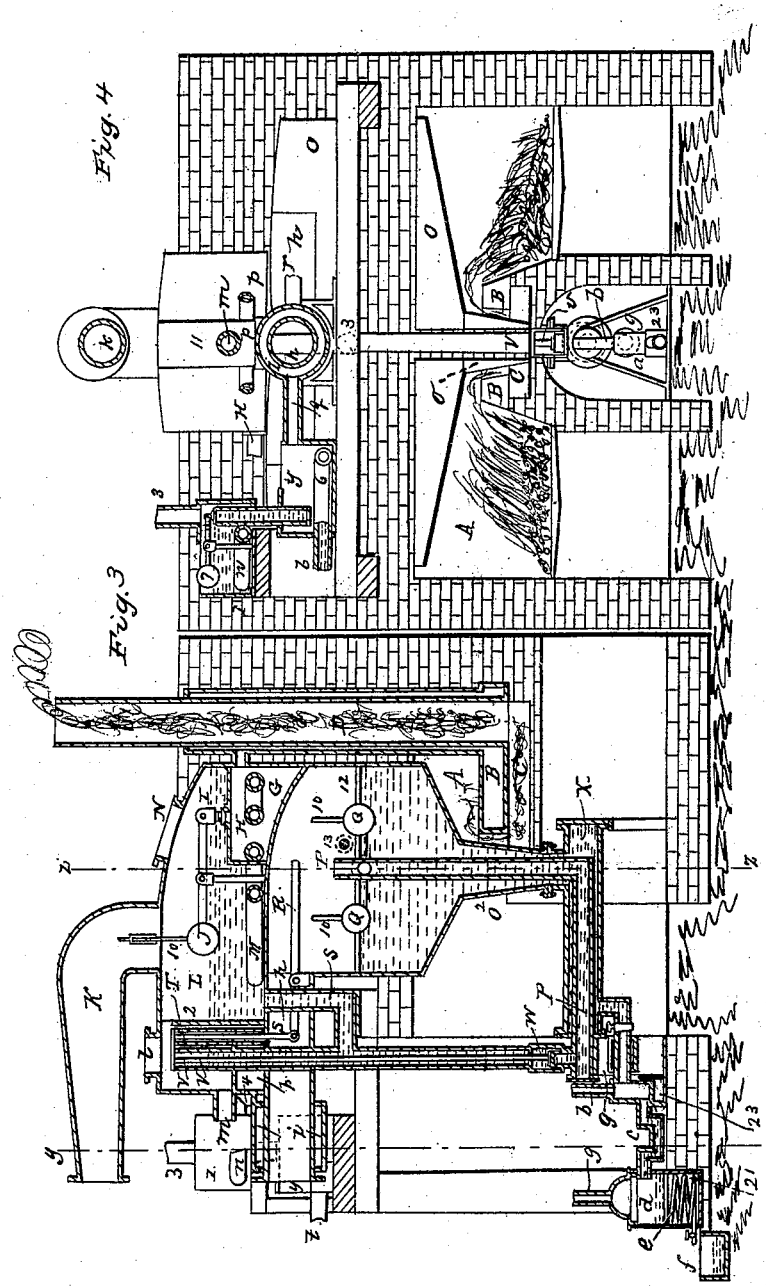

WILLIAM G. W. JAEGER, OF BALTIMORE, MARYLAND.

IMPROVED APPARATUS FOR CONTINUOUS DISTILLATION.

Specification forming part of Letters Patent No. 54,358, dated May 1, 1866; antedated April 16, 1866.

*To all whom it may concern:*

Be it known that I, WILLIAM G. W. JAEGER, of Baltimore, in the county of Baltimore and State of Maryland, have invented a new and useful Improvement in Apparatus for Continuous Distillation; and I do hereby declare that the following is a full, clear, and exact description thereof, which will enable those skilled in the art to make and use the same, reference being had to the accompanying drawings, forming part of this specification, in which—

Figure 1 is an elevation of a vertical cross-section taken on the line $z$, Fig. 3, of a distilling apparatus made according to my invention. Fig. 2 is a plan view, the horizontal part of the goose-neck K being removed. Fig. 3 is a vertical section taken on the line $x$ of Fig. 2. Fig. 4 is a vertical cross-section taken on the line $y$ of Fig. 3.

The object of this invention is the improvement of apparatus for distilling petroleum and other hydrocarbons, and also other liquids.

In distillations conducted according to the methods now commonly practiced, in which a large body of oil is subjected to an intense and continuous heat in order to distill the whole charge, a portion of the oil becomes charred and burnt, and is changed into a tarry matter, which, if it is allowed to remain in the still until the operation is finished, becomes partly changed into a gaseous form and partly into vapor of an inferior kind, which vapor, on condensation, produces an inferior oil and injures the whole product, and, besides, a larger percentage of acid and alkali is required to deodorize the product.

These results are prevented by my invention, which consists, among other things, in separating the benzine and lighter oils from the rest of the supply before it reaches the main retort or still by means of an upper retort or still heated from contact with the crown of the main still, so that the main retort or still will be supplied with a comparatively homogeneous liquid; also, in regulating the temperature of the liquid in the upper retort or still by means of water and steam circulating through a chamber and pipes placed in and below said upper still, so that such liquid shall not be heated to a higher temperature than is necessary to send off the benzine and lighter oils; also, in using the overflow and heated water from the condenser to raise the temperature of the fresh liquid while on its way to a distilling apparatus; also, in supplying a retort or still by a continuous feed as fast as the charge is reduced, and so keeping the charge at a uniform height in a retort or still; also, in discharging at the bottom the heavy oils and matters that collect in the lower parts of a still; also, in conducting the feed-pipe through the pipe which discharges the heavy oils and residuum, whereby the temperature of the latter is reduced and that of the former raised; also, in providing for the foaming and boiling over of a retort or still by means of an overflow-chamber, which will prevent the oils or other liquids from being carried mechanically by the vapor into the goose-neck; also, in apparatus for cleaning the bottom of a still without interrupting the distillation.

The apparatus here shown, and by means of which I propose to illustrate my invention, is sustained by a wall of brick or other suitable material. The retorts or stills are two in number, and are placed one over the other, a part of the crown of one forming a portion of the bottom of the other. The lower still, O, is directly over the furnace or furnaces.

In this example I have made provision for a double furnace, A A, having a common flue, C, placed between them, a boiler, B, being fixed above the flue. This boiler is exposed on both its sides to the fires of the furnaces, and the flames and gases on their way to the flue C pass over the boiler and down through a descending annular flue, 20, made around the conical bottom $O^2$ of the still O, between it and the end of the boiler, which is at that place made semicircular for the purpose of increasing the fire-surface.

The flue C communicates with a chimney-flue, D, which passes upward at the side of the still, and is surrounded for a good part of its height by a vertical continuation, E, of the boiler. This vertical part E is of annular form, because it surrounds the flue, and is connected by a short horizontal pipe, F, with a steam and water chamber, G, placed between the upper and lower stills. Another pipe, 19, branches off from the vertical extension E, at a point near its top, to supply steam for motive power, or for any other purpose. The water and steam in the chamber G are free to circulate through a horizontal pipe, M, which leads off from and returns to the back wall of the chamber G. This pipe M is carried several times to and fro over the bottom of the upper still before it returns to said chamber. The chamber G may be connected with the boiler by a duplicate pipe F, if thought necessary for freedom of circulation. It will be observed that by this arrangement I am enabled to save the heat which has heretofore been wasted by radiation from the crown of the still, and by means of it raise the temperature of the water in the chamber G, and also heat the charge in the upper still; and since the contents of chamber G and pipe M will, owing to their connection with the boiler, have the same temperature, or nearly so, as the contents of the boiler, it follows that if too great a heat is imparted to the upper still from the crown of the lower still the same will be moderated and lowered, by reason of the presence of the water and steam in said chamber G and pipe M, so as to allow the charge in said upper still to reach such a degree of heat only as will serve to separate the water which may be present, and to throw off therefrom the benzine and lighter oils, which, being highly volatile, pass off at a comparatively low temperature. The pipe M and chamber G therefore serve to regulate the temperature of the charge of the upper still, and prevent the heavier oils from being vaporized and carried over through its goose-neck K with the lighter oils.

By this means I am able to separate the benzine and lighter oils, and also the water, from the rest of the charge before it reaches the lower still, O.

The steam and water chamber G can be continued across the still L until it is in line with the back of pipe s, or to the wall 2, by which means the upper and lower stills will be separated by said chamber.

When the said chamber is continued in that manner the circulating-pipe M can be dispensed with, and the pipe s from the bottom of the upper still can then be changed in position.

In cases where the saving of fuel is no object, and the boiler B E is dispensed with, the chamber G can be fed directly from pipe 4, and when there is not sufficient pressure to be had to establish a proper circulation and supply of water for this purpose a pump can be used to force the water into said chamber. The boiler is to be supplied with the usual safety-valve and gages, to prevent accidents.

When using my condenser, patented 28th June, 1859, in connection with a distilling apparatus made upon the principle herein described, I am enabled, while carrying on a continuous distillation, to separate the benzine from the burning oil without redistillation, because by that condenser the benzine will be further separated from whatever burning oil may be present with it.

The oil or liquid to be distilled is supplied to the still L through a pipe, H, whose mouth is governed by a valve, I, which is raised and lowered on its seat by means of a hollow float, J, resting on the surface of the liquid in said still. On the upper side of said float is an open pipe, which communicates with the interior of the float and prevents it from being ruptured by the expansion of the air therein.

If it is desired, a valve may be placed in the pipe 10 to prevent any vapor or liquid from entering the float, and at the same time allow the expanded air to pass out.

The float J may be dispensed with by bringing the still L and its supply-chamber 1 to about the same level, and establishing a trap of the ordinary construction in the pipe which connects them.

For the purpose of detecting any imperfect feed, water-gages like those used in steam-boilers may be placed outside of both the upper and lower stills, their upper and lower ends communicating with the upper and lower parts of the stills, so that in case the floats become deranged the height of the oil or other liquid in the stills may be known to the operator.

Suitable faucets are to be applied to the different pipes leading to and from the stills, so as to control the flow of the oil or other liquid in case of accidents, or when letting down or discharging the stills for the purpose of repairs.

The pipe H enters the chamber G from without, (see Figs. 1 and 4,) and after traversing back and forth over its floor, as shown in Figs. 1, 2, and 3, it is conducted upward into the still L. In this example of my invention said pipe H is connected with the supply-chamber 1, from near the bottom of which it issues forth on its way to the still L.

The oil or other liquid to be distilled is conducted into chamber 1 by a pipe, 6, whose mouth, which is extended well up in the chamber, is controlled by a valve, 8, that is opened and closed by means of a float, 7. The pipe 6 is carried up into chamber 1 from a lower chamber, y, into which it enters on the left-hand side in Fig. 4, and across which it is taken to and fro several times. This pipe 6 comes to the chamber y from any reservoir of the liquid to be distilled. These chambers 1 and y are to be closed with tight covers, and are here shown open only for the purpose of exposing to view the pipes n and 6, which traverse them, respectively.

The chamber y is provided as a reservoir to receive the waste water of the condenser (not shown) of the still, which water is conducted into said chamber through a pipe, t, (see Fig. 3,) which enters the chamber near its bottom. The water is discharged from said chamber through a pipe, q, which leaves it near its top, and which enters a hot-water jacket, i, placed around the goose-neck h of the lower still. From this jacket the water is conducted by a pipe, r, (shown broken away in Fig. 4,) into a water-chamber, p, placed above the goose-neck $h$, from which it is conducted by a pipe, $n$, through the oil-supplying chamber 1, and thence by a pipe, 4, with which it is connected to the boiler B.

The waste water of the condenser, being at a high temperature when it enters chamber $y$, gives off some of its heat to the contents of the pipe 6, which circulates through said chamber, and thus reduced in temperature it is next taken to the jacket $i$, and thence through water-chamber $p$, whereby the temperature is raised before it is taken by pipe $n$ through the oil-supply chamber 1. The oil in pipe 6, being meanwhile somewhat heated while passing through chamber $y$, is delivered in that state into chamber 1, and while there is further heated by contact with the hot-water pipe $n$, so that when it is ready to enter the pipe H, which conducts it to the still L, it is nearly at the temperature required to drive off the light benzine, all which assists in carrying on distillation rapidly and economically.

The hot waste water from the condenser serves to heat the oil or liquid which is on its way to the upper still, L, the said liquid passing, while in pipe 6, through the water, and afterward the water, while in pipe $n$, passing through the body of said oil or liquid.

A vapor-escape pipe, 3, is fixed in the cover of chamber 1 in order to relieve it from any vapor which may be generated by the action of the hot water on the oil or other liquid in that chamber.

A check-valve (not shown) may be placed in the feed-pipe H, between chamber 1 and the still L, so as to prevent the backing up or return of the liquid from that still, which return might be caused by the foaming of the charge therein—a phenomenon which sometimes takes place when a body of oil and water, or of oil mixed with water, is suddenly subjected to a high heat, although there is little or no danger of such foaming and consequent overflow when the liquid is fed to a still gradually and continuously through a small pipe like that shown at H.

The vapor and steam generated from the water in the charge will have sufficient space for expansion, because there will not be much water present at any one time, and because such water will be vaporized as soon, or nearly as soon, as it is delivered into the still, and consequently will not throw the whole charge into commotion, as is the case where the whole body of oil and water is brought at the same time up to a high heat and the water is caused suddenly to flash into steam.

The gradual and continuous feed of the still O by its pipe P will in like manner prevent the foaming of its charge. I have, however, guarded against the difficulties which might come from the foaming of the charge in the still L by providing an overflow-chamber, 11, with a discharge-pipe, $m$, which chamber will receive the liquid when driven up toward the top of the still, and so prevent the danger of its passing into the goose-neck, and thence into the condenser.

The numeral 11 designates the overflow-chamber above spoken of. It is separated from the upper still, L, by a partition, 2, which is not extended up to the crown of the still, but leaves an opening above its upper edge, through which any excess of oil or other liquid, or its overflow when in a state of commotion, can escape from the still into the chamber 11, from which it passes away through a pipe, $m$, which may be led into any receptacle, and which may be provided with a valve to shut the pipe against any inflow of air, vapor, or liquid through it into chamber 11. The chamber 11, it will be observed, is directly over the water-chamber $p$.

All vapors and gases generated in pipe V will pass through the overflow-chamber and out at goose-neck K.

From the bottom of the upper still, near its back part, proceeds a descending pipe, $s$, which, after a short descent, is bent to a horizontal line and carried backward to connect with a vertical tube, V, through the center of which, throughout its whole length, is extended the spindle $v$ of a valve, W, which valve closes the tube V at bottom, where it communicates with the horizontal portion of the feed-tube P of the lower still.

The tube V passes vertically through the goose-neck $h$, and thence up through the chamber $p$ into the overflow-chamber, near whose top it terminates.

The upper end of the tube V is open, and the top of the spindle passes through it and is there connected to a cross-head, $j$, to which is also connected the top of a rod, $s$, which rod descends through an open tube, T, that extends downward and parallel to tube V through the bottom of chamber 11, and entirely through the water-chamber $p$, its lower end opening into the goose-neck $h$.

The rod $s$ passes down through the center of tube T into the goose-neck, where it is hinged to the end of a lever, R, from whose opposite end is suspended a bar or frame which carries one or more floats, Q. Two floats are shown in this example. These floats and float 7 are, like float J, hollow, and are to be provided with vent-tubes, as above explained of float J, which extend vertically upward and allow the escape of air therefrom, and so avoid the liability of being torn open or made to leak from the expansion of confined air.

The lower still, O, has one or more man-holes, one of which is seen at O, piercing one side of the supporting-wall; but it may be placed elsewhere—as, for instance, on the top, as indicated in red outlines at 22. The bottom of the still declines from each end and side toward its center, where it takes the shape of an inverted truncated cone, $O^2$, the inverted top of which—that is to say, its lowest part—opens into a horizontal discharge-pipe, X, whose outer end is intercepted by a pipe, Y, extending first vertically downward and then in a horizontal line toward a chamber, a, one or more of whose sides is composed of mica or other material capable of resisting or enduring high temperatures without injury, for the purpose of making such side or sides transparent, and so subjecting the stream of heavy oil and residuum to the inspection of the operator.

If the heavy oils and residuous matters while at a high temperature are drawn off and discharged suddenly into the air, spontaneous combustion will be apt to take place. In order to provide against this danger and to prevent such accidents, I conduct such heavy oils and residuous matters through conduits and chambers wherein they are kept from contact with the free atmosphere, and also reduce their temperature while passing through, at the same time regulating their discharge by means of faucets. When they are at last discharged into their final receptacle they are reduced in temperature below the point of danger from contact with the atmosphere. In order to allow them to run freely through such conduits and chambers it is necessary to carry off the vapors which arise from them, and which would, if not removed, tend to obstruct their flow.

The chamber a receives these hot residuous matters and heavy oils from the pipe Y in a small but continuous stream, whose volume is determined by means of the faucet Z, and whose temperature is reduced by means of a refrigerating-jacket, g, which surrounds part of the pipe Y. This jacket may be made in any suitable way and supplied with cold water or other refrigerating material.

In addition to the cooling device g, applied to the discharging apparatus, as above explained, I have also provided a refrigerating-vessel, 23, beneath chamber a, the bottom of the latter being immersed therein to a greater or less extent, as desired. This refrigerating-vessel may be supplied with any proper cooling medium by means of pipes or otherwise.

The chamber a is perforated at any suitable place to receive a small vapor and gas pipe, b, which will conduct off any vapor and gas which may arise from the liquid and prevent its flow from being interrupted by this cause. The pipe b may lead into a flue, or into the open air, or into a condenser. From this chamber the said liquid is conducted through a pipe, C, which is depressed to form a trap, into a receiver, d, beneath which a refrigerating-chamber, 21, is formed. This chamber 21 can be made and supplied with cold water or other cooling medium in any suitable way, the form of the refrigerating apparatus and the kind of cooling medium used being in this case, as in the case of the jacket g, of no moment, provided the temperature of the flowing liquid is properly reduced by their means. This refrigerating-chamber contains a worm, e, that runs from the receiver d and is carried out through the front wall of the refrigerator, 21, where it is allowed to discharge into a receptacle, F.

The mouth of the worm is to be supplied with a faucet of any suitable kind, so as to control the flow of the liquid through it and keep the worm filled. The rate of discharge should not be so rapid as to allow that end of the worm which enters the receiver d to be uncovered. The receiver d is supplied, like the chamber a, and for the same purpose, with a vapor and gas escape pipe, 9, which is led off in like manner as the vapor-pipe b.

The trap-pipe c may, if desired, be fitted with a faucet for the purpose of trying the gravity of the residuum or oil that passes through it.

It will be observed from this construction that the heavy oils, tarry, and other residuous matters which descend from the bottom of the still are conducted in a continuous stream or current through the pipe X and the succeeding pipes and chambers above mentioned until they are delivered into the final receptacle f, and that their flow is constantly under the control of the operator, so that they can be kept in the still for a longer or shorter time, according to the exigency of the work or the will of the operator, and that their temperature is reduced in three successive ways—first, by the transmission through them of the supply oil or liquid on its way to the still; secondly, by the cooling apparatus g and 23; and, thirdly, by the refrigerating device 21 and worm e.

It will be also observed that noxious vapors and gases from these liquids are separated and carried off before the liquids reach this receptacle f by means of the escape-pipe b and 9.

I do not confine myself to the form or construction here given of the transparent receiving-chamber a; nor do I confine myself to any particular form or construction of apparatus for receiving the heavy oils and residuous matters as they are discharged from the bottom of a still, nor to the use of any particular material out of which to make it, nor to any particular point in the course of discharge at which I place the same, nor to any particular manner of receiving and passing such oils and other matter through such transparent chamber or apparatus, nor to the construction or manner of application here shown of a relief-pipe, b, my invention consisting in receiving the matters discharged from the bottom of a still in an apparatus with closed sides, one or more of which is transparent, so that said matters can be discharged and allowed to run off at any degree of heat without exposure to the atmosphere, and at the same time be exposed to the view of the operator, that he may know their volume and character, the said apparatus being also provided with a vent for the vapors and gas which may arise from such matters as they pass along.

Where it is desired to run the heavy oils and residuous matters to dryness or to a coke, they can be collected for that purpose directly after leaving the transparent chamber, and then be fed from time to time into a suitable retort for such further distillation. By carrying on such subsequent distillation in a small retort the main or large still will be saved from the injurious consequences which are likely to follow when a charge is run to dryness or to a coke therein.

The transparent chamber $a$ may be made without an escape-pipe for gas or vapor—as, for instance, when the heavy oil and other matters are conducted therefrom into their receptacle without the use of a trap.

It is well known to practical distillers that when the distillation of a charge is continued to dryness, or even to a heavy pitch, it becomes necessary to cool down the still to a low temperature before an operative can enter it for the purpose of cleaning the bottom.

I have found that nothing is gained by running the charge down to a coke or to dryness, since a large portion of the heavy oil and tarry matters thrown down during the latter part of the operation become decomposed by being subjected to the continuous and intense heat, and are converted partly into a pitch and partly into burnt and gaseous vapors, which latter pass over and become condensed and mixed with the purer oils, by which means the whole body of oil run from the charge is more or less injured, and consequently requires a large percentage of acid, alkalies, and labor in the process of purifying and deodorizing it.

The extra percentage of inferior oil obtained in this way is more than counterbalanced by the injury to the still from the intense heat employed and from the extra percentage of acids and alkalies required to purify the same, and at the same time every additional pound of acid used in purifying and deodorizing the distillate carries down with it an additional percentage of oil. These disadvantageous results are avoided by a continuous discharge of heavy oils and residuous matters according to my invention. Besides, it will be observed that my invention decreases the percentage of tarry matter produced, and that which is produced is much purer than that thrown down in ordinary stills, where such matters are allowed to remain in the stills to be boiled over and over, a portion becoming vaporized and thus injuring the quality of the distillate.

With a properly-regulated system of continuous distillation and continuous discharge of residuous matters the percentage of tarry matter is small, and I make my stills low— that is to say, the goose-neck is not greatly elevated above the bottom, as is the case in ordinary stills, whereby the heavier vapors, which are usually driven over with difficulty, are enabled to pass out freely, thereby avoiding the burning and decomposing of such heavy vapors into tarry and gaseous matters as when in high stills. After ascending a little way they fall back again toward the bottom.

The feed-pipe P here represented, which receives the oil or other liquid from the vertical tube V, is carried through the end of pipe X and along within the same until it comes below the mouth of the conical part $O^2$ of the still, where it is turned and carried upward through the center of said part $O^2$ into the still O, terminating above or near the height at which it is desired that the charge shall be kept while the still is in active operation; and said pipe P has lateral branches P', two or more in number, open at their ends, which go off from it in different directions at or near the desired height or level of the charge. The oils and other liquids to be fed to the still O will be discharged into it through the branches P, being supplied automatically in greater or less quantity from the upper still, according as the valve W of the tube V is opened a greater or less degree.

The branches P' are sustained upon cross-bars like that indicated at 12. The bars may stretch from side to side of the still, and thereby brace the still, and also sustain the branches without obstructing its bottom.

The automatic action of the feeding devices is attained through the floats Q, which rise and fall with the charge in the still in which they float, and when they fall below the level at which the valve W will be kept closed they turn the lever R on its fulcrum and raise the connecting-rods S and U, and so bring the valve W off from its seat and open communication between the tube V and the feed-pipe P. A spring may be used to prevent valve W from being displaced.

When distillation is not carried so far as to produce a heavy pitch, or to dryness, but the residuum is discharged while it is in a liquid state, only a very small portion thereof will be found adhering to the bottom of the still in cooling down. Consequently it is evident where the process of distillation is carried on without cessation, as by my invention, and where the residuum is withdrawn from the still continuously during the process of distillation (as fast as it is thrown down) at a high temperature and in a liquid state, that such residuum will not adhere to the bottom while the operation is going on. Since, however, there is usually more or less foreign matter in petroleum and other oils, which forms a sediment and is apt to adhere to the bottom of a still when cooling down, and which in time would form a crust thereon, I have provided means for removing the same and keeping the bottom clean without requiring the still to be cooled down to enable a workman to enter it, as now commonly done where the charge is reduced to dryness. The provision I have made is the use within the still of scrapers operated from without, one of which is shown in Fig. 1. The scraper 15 here shown has a blade that conforms to the shape of the bottom of the retort or still whatever that shape may be. It is here shown operated by means of a rod, 13, which passes through a refrigerating box or cylinder, 24, and a stuffing-box, 14, at one end of the still.

The refrigerating device in this example consists of a hollow cylinder with double walls, so as to form an annular chamber in which any cooling medium is placed by means of pipes or otherwise. The object of this cooling device is to protect the stuffing-box 14, through which the rod 13 works, from the heat of the still.

The ends of the scraper on their return movement ride upon ways 16 and 17, placed near the bottom of the retort or still, on each side, and at such an elevation from the bottom as to raise the scraper up clear thereof, and at the same time allowing sufficient space for the cross-bar of the scraper to pass free between the slide and the bottom of the still.

The ways 16—there being one for each end, although only one is here shown in the sectional view, Fig. 1—are horizontal, and their ends do not extend quite to the end wall of the still, whereby the scraper is allowed to pass beyond them and fall down on the bottom of the still. On pulling the rod 13 outward the scraper is moved over the bottom of the still, the ends of the scraper passing beneath the ways 17, which are hinged at the point 18, where they connect with the ways 16. The free ends of the ways 17 lie on the bottom of the retort or still, and when the scraper is drawn far enough toward the right, observing Fig. 1, its ends raise up the ways and pass from beneath them. The ways then fall again upon the bottom of the still and form inclined planes, upon which the ends of the scraper mount when the rod 13 is pushed inward, and so are brought again upon the horizontal way 16.

In the drawings, Fig. 1, the scraper is represented as being yet upon the ways 16, just about to fall from their ends to the bottom of the still. I have only shown in this example a scraper applied to one-half of the area of the bottom of the still; but it is evident that the same rod may be made to carry another scraper to operate on the right-hand side of the still, ways like 16 and 17 being also placed on the bottom on that side, or the scraper on that side may be operated by means of a rod, like the rod 13, passing through a stuffing-box in the left-hand side of the still. Since such ways and scraper would be merely duplications of those already shown, I have not thought it necessary to represent them.

The free ends of the ways 17 rest on the bottom of the still on a line with the conical part $O^2$ of the bottom, so that the scrapers act quite up to that line before they emerge from beneath the ways 17, and thereby bring the tarry and heavy matters which may be collected on the bottom down toward the part $O^2$, into which they pass by gravity.

I do not confine myself to any peculiar form of still, nor to any particular point for discharging and feeding it, since these may be varied without leaving the principle of my invention, my object being to construct a distilling apparatus so that the residuous matters and heavier oils will be discharged from the bottom of the still as fast as they are formed, and the fresh liquid be fed to the still through the matters so discharged, whereby the inflowing liquid is increased and the outflowing residuous and other matters reduced in temperature, and the process of distillation meet with no check in consequence of its addition to the charge.

The still O, which I have called the "main" still, may be used without the upper still, and when so used the feed-pipe P can be supplied from a reservoir of the oil or liquid to be distilled—as, for instance, from the reservoir 1 through its pipe H.

Having thus described my invention, I claim as new and desire to secure by Letters Patent—

1. Feeding a still by means of a feed-pipe passing up therein through its bottom, substantially as shown and described.

2. Discharging the heavy oils and the residuous matters resulting from the process of distillation in a continuous flow through the bottom of a still, substantially as shown and described.

3. I am aware that it is not new in stills where the heavier oils and residuous matters remain therein during the process of distillation to supply fresh oil through a feed-pipe which enters the top or sides of the still, and therefore I do not claim, broadly, feeding a still during the process of distillation; but I claim in a distilling apparatus the following elements or principles of operation: first, that the heavier oils and residuous matters are discharged therefrom as fast as they reach the bottom of the still; second, that such matters are cooled or reduced to a comparatively low temperature before they are finally discharged or brought in contact with the atmosphere; and, third, that the still is kept continuously charged by a supply which is led up through and heated by the matters so discharged, substantially as described.

4. Passing the supply oil or liquid to a still through the residuum and heavy oils discharged therefrom, substantially as described.

5. Controlling the flow of the oils and residuous matter discharged from the bottom of a still by means of a faucet or faucets in the pipes through which they pass, substantially as shown and described.

6. Reducing the temperature of the outgoing heavy oils and residuum and increasing the temperature of the ingoing supply of oil or other liquid by running the pipe of the one within the other, substantially as shown.

7. The open supply-pipe V, in combination with the pipe s, leading from the bottom of the upper still, L, and the feed-pipe P, leading to the lower still, O, substantially as above shown.

8. Controlling the flow of the supply-oil or other liquid into the feed-pipe P by means of a valve, W, substantially as above shown and described.

9. In combination, in a distilling apparatus, the use of an open float or floats, substantially as described, the feed-pipe P, and the vertical supply-pipe V, whose upper open end communicates with the overflow-chamber, substantially as shown.

10. Driving off the benzine and lighter oils and water from the oil to be distilled by means of the heat which radiates from the top of the main still and steam-chamber G, substantially as described.

11. Interposing a water and steam chamber, or water and steam pipes, between the upper and lower stills, for the purpose of regulating the temperature in the upper still, substantially as and for the purpose above described.

12. I do not claim feeding a still continuously through its top or sides where the residuum is allowed to remain therein until partially decomposed, coked, or until it is drawn off in a body; but I claim, in combination, feeding oil or other liquid to a still continuously and at a temperature made to approximate to that of the charge, as described, and at the same time discharging the heavier oils and residuous matters continuously as they are thrown down toward the bottom of the still, substantially as shown and described.

13. In combination, the lower still, O, the upper still, L, and the water and steam chamber G, with or without a circulating pipe, M, substantially as described.

14. Connecting the water and steam chamber G to the boiler, substantially as and for the purpose above described.

15. Raising the temperature and controlling the inflow of oil or other liquid as it passes into the upper still, substantially in the manner above described.

16. In combination, the open pipe V, the pipe s, the tube T, and the overflow-chamber 11, substantially as shown.

17. Conducting the supply of oil or other liquid into the upper still through a hot-water and steam chamber, substantially as described.

18. The transparent receiving-chamber a, or equivalent apparatus, to receive the heavy oils and other matters discharged from the bottom of a still, substantially as described, with or without a gas or vapor escape pipe.

19. The receiver d, constructed substantially as described, with a refrigerating apparatus connected thereto for cooling the matters discharged from the still before their final escape, substantially as described.

20. Providing the transparent chamber and the receiver d, one or both, with vents or vapor and gas escape pipes b and q, substantially as described.

21. Applying a refrigerating apparatus to the pipe Y behind the transparent receiving-chamber a, substantially as described.

22. In combination, the regulating-faucet Z in the pipe which delivers the discharged heavy oils and residuous matters into chamber a, the transparent chamber a, and the trap-pipe c, substantially as set forth.

23. In combination, the transparent chamber a, its vent-pipe b, the trap-pipe c, and the receiver d, substantially as set forth.

24. Placing a cooling device beneath the receiving-chamber a, substantially as above described.

25. In combination, the chamber a, provided with a vapor or gas pipe, as shown, and the trap-pipe c or its equivalent, substantially as shown.

26. In combination, the chamber a, provided with a vapor or gas pipe, as shown, the cooling device 23, and a trap-pipe, c, or its equivalent, substantially as shown.

27. In a distilling apparatus, extending the boiler upward around the smoke-stack or flue, as shown at E, substantially as and for the purpose above described.

28. In a distilling apparatus, drawing off from the bottom of the still continuously, or as often as required, the heavy oils and residuous matters of the charge, and at the same time feeding the still as the charge is reduced by a supply through a pipe which traverses or passes through that portion of the charge which is being withdrawn, substantially as described.

29. In a distilling apparatus with continuous discharge of heavy oils and residuum, conducting the flames and products of combustion from the fire chamber or chambers toward the center of the bottom of the still or place of discharge, substantially as shown.

30. I am aware that air-tight floats have been used in boilers and closed vessels to indicate the height of liquids, and to effect an automatic feed; therefore, I do not claim the use of floats, broadly; but what I do claim is the use, in a distilling apparatus, of a float or floats made with a vent-pipe, as above shown, or equivalent device, either with or without a valve, substantially as above set forth.

31. The application to a hollow float of a pipe rising therefrom, with or without an outwardly-opening valve, substantially as and for the purpose above described.

32. Cleaning the bottom of a still during distillation by means of a scraper or scrapers operated from without, substantially as shown and described.

33. The ways 16 and 17, severally constructed and applied as shown, for the purpose of raising the scraper from the bottom on its return movement.

34. Placing a water-jacket, 24, or equivalent device, between the end of the still and the stuffing-box 14, substantially as shown and described.

35. Using the overflow waste-water from the condenser for raising the temperature of the fresh oil or other liquid while on its way to a still by passing the same through the water in the chamber y, substantially as described.

36. Passing the overflow waste-water of the condenser (after it leaves the chamber y) through a water-jacket surrounding the goose-neck h, and thence through a water-chamber, p, between the said goose-neck h and the over flow chamber 11, for the purpose of reheating it, substantially as described.

37. The use of the supply-chamber 1, which receives the oil or other liquid after it has traversed the water-chamber $y$, and through which the heated water from water-chamber $p$ is led in a pipe, $n$, substantially as and for the purpose above described.

38. The double furnaces A A, combined and operating substantially as and for the purpose described.

WM. G. W. JAEGER.

Witnesses:
 M. M. LIVINGSTON,
 GUSTAVE DIETRICH.